No. 746,502. Patented December 8, 1903.

UNITED STATES PATENT OFFICE.

WILLIAM A. HALL, OF BELLOWS FALLS, VERMONT.

SYNTHETIC-MILK COMPOUND AND PROCESS OF PRODUCING SAME.

SPECIFICATION forming part of Letters Patent No. 746,502, dated December 8, 1903.

Application filed January 17, 1902. Serial No. 90,197. (No specimens.)

*To all whom it may concern:*

Be it known that I, WILLIAM A. HALL, a citizen of the United States, residing at Bellows Falls, in the county of Windham and State of Vermont, have invented or discovered certain new and useful Improvements in Synthetic-Milk Compounds and Processes of Producing Same, of which the following is a specification, reference being had therein to the accompanying drawings.

It is generally supposed that milk is composed of a very fine emulsion and that the casein which it contains is held very finely divided in suspension and quite largely through the aid of calcium salts. It has always been desired to take advantage of this fact, and thus produce a synthetic milk from ordinary commercial casein and milk-sugar, with or without milk-oil or butter-fat. I have discovered a process wherein this fact can be accomplished.

To manufacture my synthetic milk I proceed as follows: Any good grade of ordinary dry commercial casein may be dissolved by the aid of any suitable alkali, preferably bicarbonate of soda, the amount of alkali depending upon the acidity of the casein. When a complete solution is obtained by the aid of heat and water, the casein is again evaporated to dryness by the aid of a vacuum-pan or any other convenient method, or in place of making a complete solution of the casein I find that I am able to grind ordinary dry commercial casein to about the consistency of coarse granulated sugar, then put the casein in a mixer of some sort, and gradually add the amount of alkali which would be necessary in case the alkali was put into the casein dry, and in this case the alkali is mixed with the smallest amount of water which will make a complete solution of the alkali and is gradually poured onto the casein as it revolves in the mixer, thus coating and to some extent saturating every particle of casein with a solution of alkali, and consequently rendering it very easily soluble when water is added. However, either one of the above processes or any process whereby the casein is rendered very easily soluble will answer my purpose. In either case the casein after being treated with the alkali and dried is ground to a very fine mesh, preferably about one hundred and twenty. I now add calcium chlorid or its chemical equivalent to this finely-ground soluble casein. I prefer, however, to use calcium chlorid, as it is comparatively cheap and imparts no taste to the synthetic milk when dissolved and only a very small amount is necessary to secure the desired results. The calcium chlorid partially counteracts the solution of the casein and leaves the latter in a very fine suspension, about as it exists in natural milk, thus imparting the desired whiteness thereto.

After the addition to the soluble casein of the dry calcium chlorid dry milk-sugar in the proportion in which milk-sugar is ordinarily present in normal cow's milk is added to the casein mixture, and if the synthetic-milk composition is to contain the ingredients of whole or unskimmed milk the desired amount of butter-fat is then added. The resulting product is then thoroughly mixed and, if necessary, spread on trays and dried. It is then ready for the market.

To enable those skilled in the art to practice my invention or discovery, I give below the preferred proportions necessary to compound the article. To about eighty-five parts of ordinary dry commercial casein I add about ten parts of bicarbonate of soda or equivalent alkali previously dissolved in the smallest possible amount of water. This alkaline solution is gradually added to the dry casein, the casein being agitated or stirred in the meantime, and in this manner each individual particle of casein is coated with the alkali, and thus rendered soluble. The soluble casein is then dried and ground to a very fine mesh, preferably about one hundred and twenty. I then add about two parts of finely-powdered calcium chlorid or its chemical equivalent to this mixture, and to about every four and one-half parts of the casein thus prepared I add about five parts of powdered milk-sugar, and if a "whole" synthetic composition is desired I also add about five parts of a suitable butter-fat. These ingredients are then thoroughly mixed together, and the compound (preferably in dry condition) is then ready for the market.

To produce the synthetic milk, about ninety-five parts of cold water are added to the commercial compound, and then by heating the mixture to about 150° Fahrenheit a liquid is obtained which has all of the characteristics of fresh sweet milk as regards flavor, opacity, curdling effect, &c.

I do not limit myself to the exact proportions of the several ingredients as above stated, as they may be varied somewhat without essentially changing the nature of the invention or discovery.

Having thus described my invention or discovery, I claim and desire to secure by Letters Patent—

1. The herein-described compound for the production of synthetic milk, the same consisting of casein, an alkali, calcium chlorid and milk-sugar, in substantially the proportions stated.

2. The herein-described compound for the production of synthetic milk, the same consisting of casein, an alkali, calcium chlorid, milk-sugar, and a butter-fat, in substantially the proportions stated.

3. The herein-described compound for the production of synthetic milk, the same consisting of dry commercial casein, bicarbonate of soda, calcium chlorid, and powdered milk-sugar, in substantially the proportions stated.

4. The herein-described compound for the production of synthetic milk, the same consisting of dry commercial casein, bicarbonate of soda, calcium chlorid, powdered milk-sugar, and a butter-fat, in substantially the proportions stated.

5. The herein-described process for producing a composition suitable for the production of a synthetic milk, said process consisting in thoroughly mixing about ten parts of an alkali, dissolved in water, with about eighty-five parts of ordinary dry commercial casein, then grinding the mixture to a very fine mesh, then adding about two parts of finely-powdered calcium chlorid, then adding to the mixture of the three ingredients stated, and to about each four and one-half parts of the casein thereof, about five parts of powdered milk-sugar, and then thoroughly mixing the stated ingredients together.

6. The herein-described process for producing a composition suitable for the production of a synthetic milk, said process consisting in thoroughly mixing about ten parts of bicarbonate of soda, dissolved in water, with about eighty-five parts of ordinary dry commercial casein, then grinding the mixture to a very fine mesh, then adding about two parts of finely-powdered calcium chlorid, then adding to the mixture of the three ingredients stated, and to about each four and one-half parts of the casein thereof, about five parts of powdered milk-sugar and then thoroughly mixing the stated ingredients together.

7. The herein-described process for producing a composition suitable for the production of a synthetic milk, said process consisting in thoroughly mixing about ten parts of an alkali dissolved in water, with about eighty-five parts of ordinary dry commercial casein, then grinding the mixture to a very fine mesh, then adding about two parts of finely-powdered calcium chlorid, then adding to the mixture of the three ingredients stated, and to about four and one-half parts of the casein thereof, about five parts of powdered milk-sugar and about five parts of a butter-fat, and then thoroughly mixing the stated ingredients together.

8. The herein-described process for producing a composition suitable for the production of a synthetic milk, said process consisting in thoroughly mixing about ten parts of bicarbonate of soda, dissolved in water, with about eighty-five parts of ordinary dry commercial casein, then grinding the mixture to a very fine mesh, then adding about two parts of finely-powdered calcium chlorid, then adding to the mixture of the three ingredients stated, and to about each four and one-half parts of the casein thereof, about five parts of powdered milk-sugar and about five parts of a butter-fat, and then thoroughly mixing the stated ingredients together.

In testimony whereof I affix my signature in presence of two witnesses.

WILLIAM A. HALL.

Witnesses:
PIERRE J. WURTS,
A. M. PERKINS.